UNITED STATES PATENT OFFICE.

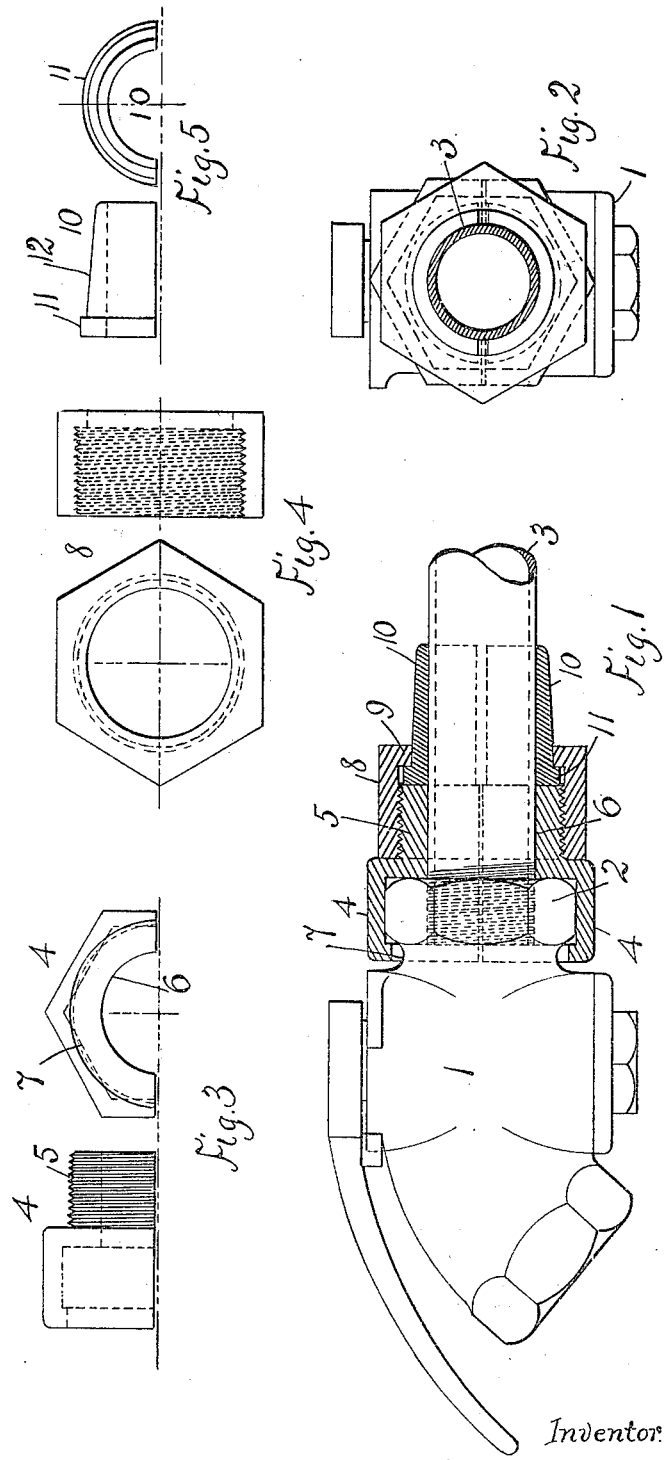

MYERS A. GARRETT, OF CHICAGO, ILLINOIS.

ANGLE-COCK AND TRAIN-PIPE CONNECTION.

957,325.

Specification of Letters Patent. Patented May 10, 1910.

Application filed October 26, 1909. Serial No. 524,616.

*To all whom it may concern:*

Be it known that I, MYERS A. GARRETT, a citizen of the United States, residing at Chicago, in the county of Cook and State of Illinois, have invented certain new and useful Improvements in Angle - Cock and Train-Pipe Connections; and I do hereby declare the following to be a full, clear, and exact description of the invention, such as will enable others skilled in the art to which it appertains to make and use the same.

In air brake mechanism the angle cock has secured to one of its ends the flexible hose and coupling, and the other end is interiorly threaded to receive the exteriorly threaded end of the train pipe. The pipe is weakened to such a degree by the threads that should the angle cock be subjected to undue or excessive strains, as often happens, the pipe breaks at the place or circular line adjacent its connection with the angle cock. Such breakage renders the air brake inoperative, the angle cock hose and coupling often are lost, and considerable expense for repairs becomes necessary.

The object of my invention is the provision of means constituting an improved connection or union of the angle cock and pipe which will transmit and distribute the strains from the angle cock to the relatively strong part of the pipe back of the threaded end portion.

With this end in view my invention consists in certain novelties of construction and combinations of parts hereinafter set forth and claimed.

The accompanying drawing illustrates an example of the physical embodiment of the invention constructed according to the best mode I have so far devised for the practical application of the principle.

Figure 1 is an elevation view of the standard angle cock and train pipe and a sectional view of means for strengthening the parts, the same illustrating the embodiment of the invention. Fig. 2 is an end elevation view of Fig. 1 complete. Fig. 3 shows side and end views of one half of a clamp. Fig. 4 shows side and end views of a clamping nut of hexagonal shape exteriorly to receive a wrench. Fig. 5 shows side and end views of a gib.

Referring to the figures, the numeral 1 designates an angle cock of well known construction; 2, the hexagonal end interiorly threaded; 3, the train pipe exteriorly threaded on one end; 4, the clamp made in two similar parts, each part having an exteriorly threaded end 5, a curved interior surface 6, an inwardly projecting flange 7, and the interior surface adjacent to the flange shaped to fit one half the the exterior surface of the hexagon 2 at the end of the angle cock; 8, the clamping nut of hexagonal shape exteriorly to receive a wrench and also interiorly threaded; 9, an inwardly projecting flange; 10, the two gibs; 11, the curved flange of a gib; and 12 is the inclined exterior surface of a gib.

To assemble the parts the gibs are inserted within the clamping nut so that the flange 11 will not bear against the flange 9 of the clamping nut, both are then passed over the threaded end of the train pipe, the angle cock is next screwed on to the end of the train pipe, the two parts of the clamp placed upon the pipe and hexagon, and finally the clamping nut is screwed upon the two parts of the clamp. It will be observed that the two parts of the clamp are in contact with the hexagon and pipe, but the gibs do not bear against the entire circumferential surface of the pipe, in other words there are open spaces between adjacent edges thereof, consequently the screwing of the clamping nut upon the clamp holds the latter in close frictional contact with the hexagon and the pipe, and at the same time the inclined surfaces 12 of the gibs in engagement with the flange 9 of the clamping nut insures the forcing of the gibs into frictional contact with the outer surface of the pipe.

Obviously the angle cock cannot be unscrewed from the train pipe and any strains imparted to the angle cock at an angle to the length of the train pipe are transmitted to the train pipe back of the threaded end thereof and distributed thereto mainly over an area corresponding to the interior surfaces of the gibs and that portion of the clamp located beneath the clamping nut.

It is clear from the foregoing description that I have produced means constituting an improved connection or union which will prevent the breaking off of the train pipe adjacent the hexagon of the angle cock.

What I claim is:

1. The combination with an angle cock interiorly threaded and provided with means at its exterior surface adapted to be engaged by a clamp, of a train pipe exteriorly threaded at the end; an exteriorly threaded clamp engaging the exterior surface of the angle cock; a flanged clamping nut interiorly threaded and engaging the threads of the clamp; and a gib fitting the exterior of the pipe and engaged by the flange of the clamping nut.

2. The combination with an angle cock interiorly threaded and provided with means at its exterior surface adapted to be engaged by a clamp, of a train pipe exteriorly threaded at the end; an exteriorly threaded clamp engaging the exterior surface of the angle cock; a flanged clamping nut interiorly threaded and engaging the threads of the clamp; and a plurality of gibs fitting the exterior of the pipe and engaged by the flange of the clamping nut.

3. The combination with an angle cock interiorly threaded and provided with means at its exterior surface adapted to be engaged by a clamp, of a train pipe exteriorly threaded at the end; an exteriorly threaded clamp engaging the exterior surface of the angle cock; a flanged clamping nut interiorly threaded and engaging the threads of the clamp; and a plurality of gibs each having an exterior inclined surface and the interior surfaces thereof fitting the exterior of the pipe and the inclined surfaces engaged by the flange of the clamping nut.

4. The combination with an angle cock interiorly threaded and provided with an exterior flange, of an exteriorly threaded clamp engaging the flanged exterior of the angle cock; a clamping nut interiorly threaded; a threaded train pipe; and a gib which engages the exterior surface of the train pipe.

5. The combination with an angle cock interiorly threaded and provided with an exterior flange, of a threaded train pipe; an exteriorly threaded clamp engaging the flanged exterior of the angle cock; a clamping nut interiorly threaded; and a plurality of gibs; the train pipe engaging the angle cock, and the clamping nut engaging the clamp and the gibs.

6. The combination with an angle cock interiorly threaded and exteriorly flanged, of a train pipe exteriorly threaded at the end; a threaded clamp formed of a plurality of parts; a threaded clamping nut; and a gib; the train pipe engaging the angle cock, the clamp engaging the flange of the angle cock, and the clamping nut engaging the clamp and the gib.

7. The combination with an angle cock interiorly threaded and exteriorly flanged, of a train pipe exteriorly threaded at the end; a threaded clamp formed of a plurality of parts; a threaded clamping nut; and a plurality of gibs; the train pipe engaging the angle cock, the clamp engaging the flange of the angle cock, and the clamping nut engaging the clamp and gibs.

8. The combination with an angle cock angularly shaped exteriorly at the end, of a train pipe; a clamp exteriorly threaded at one end and the other end in positive engagement with the angularly shaped surface of the end of the angle cock; a threaded clamping nut; and a gib; the train pipe engaging the angle cock, and the clamping nut engaging the clamp and gib.

9. The combination with an angle cock angularly shaped exteriorly at the end, of a train pipe; a clamp exteriorly threaded at one end and the other end in positive engagement with the angularly shaped surface of the end of the angle cock; a threaded clamping nut; and a plurality of gibs; the train pipe engaging the angle cock, and the clamping nut engaging the clamp and gibs.

10. The combination with an angle cock angularly shaped exteriorly at the end, of a train pipe; a clamp formed of a plurality of parts exteriorly threaded at one end and the other end in positive engagement with the angularly shaped surface of the end of the angle cock; a threaded clamping nut; and a gib; the train pipe engaging the angle cock, and the clamping nut engaging the clamp and gib.

In testimony whereof I affix my signature, in the presence of two witnesses.

MYERS A. GARRETT.

Witnesses:
H. E. HINDS,
N. MACHATTON.